United States Patent [19]
Horton

[11] Patent Number: 5,764,339
[45] Date of Patent: Jun. 9, 1998

[54] COMPRESSIVE FORCE-ACTIVATED VARIABLE FOCUS LENS AND METHOD OF MAKING THE SAME

[75] Inventor: Joseph A. Horton, Charleston, S.C.

[73] Assignee: Medical University of South Carolina, Charleston, S.C.

[21] Appl. No.: 720,835

[22] Filed: Oct. 3, 1996

[51] Int. Cl.$^6$ ............... G02C 7/04; G02C 7/06
[52] U.S. Cl. ............ 351/161; 351/160 R; 351/160 H
[58] Field of Search ................. 351/61, 160 R, 351/160 H

[56] References Cited

U.S. PATENT DOCUMENTS

| | | | |
|---|---|---|---|
| 3,431,327 | 3/1969 | Tsuetaki | 351/161 |
| 4,174,156 | 11/1979 | Glorieux | 351/161 |
| 4,435,050 | 3/1984 | Poler | 351/161 |
| 4,702,573 | 10/1987 | Morstad | 351/161 |
| 4,859,049 | 8/1989 | Muller | 351/161 |
| 4,890,911 | 1/1990 | Sulc et al. | 351/161 |
| 5,100,225 | 3/1992 | Rothe | 351/161 |
| 5,108,169 | 4/1992 | Mandell | 351/161 |
| 5,270,744 | 12/1993 | Portney | 351/161 |
| 5,408,281 | 4/1995 | Zhang | 31/161 |
| 5,500,695 | 3/1996 | Newman | 351/161 |
| 5,517,260 | 5/1996 | Glady et al. | 351/161 |

Primary Examiner—David C. Nelms
Assistant Examiner—Jason D. Vierra-Eisenberg
Attorney, Agent, or Firm—Needle & Rosenberg, P.C.

[57] ABSTRACT

A variable focus contact lens, has a body with a first half and an opposite second half. The body also has a first peripheral surface, an opposite second peripheral surface and an associated focal length. The lens includes a first material having a resilience so that as compressive force is applied to the first surface and the second surface, the focal length of the lens changes in proportion to the compressive force. A force-distributing structure is disposed within the lens for distributing force within the lens so as to inhibit astigmatism in the lens as compressive force is applied to the first surface and the second surface.

19 Claims, 2 Drawing Sheets

COMPRESSIVE FORCE-ACTIVATED VARIABLE FOCUS LENS AND METHOD OF MAKING THE SAME

BACKGROUND OF THE INVENTION

1. Field of the Invention

The present invention relates to optical lenses and, more specifically, to a lens having a focus that varies in relation to compressive force applied to the periphery of the lens.

2. Description of the Prior Art

Contact lenses are widely used for many different types of vision deficiencies. These include defects such as near-sightedness and far-sightedness (myopia and hypermetropia, respectively), and defects in near range vision usually associated with aging (presbyopia). Presbyopia occurs as a person ages when the lens of eye begins to crystallize and lose its elasticity, eventually resulting in the eye losing the ability to focus on nearby objects.

Some presbyopic persons have both near vision and far vision defects, requiring bifocal lenses to properly correct their vision. For cosmetic reasons, many people prefer wearing contact lenses to correct their vision, rather than bifocal eye glasses.

A typical single vision contact lens has a focus, which is the point on which parallel rays of light focus when the lens is placed perpendicular to the parallel rays, and an optical axis, which is an imaginary line drawn from the focus to the center of the lens. A posterior surface fits against the cornea and an opposite anterior surface has a vision surface that focuses light to correct the eye's vision. A bifocal lens has at least two vision surfaces which give rise to at least two correction powers.

Several examples of bifocal contact lenses exist in the prior art. Present methods for producing these lenses include machining the front of these lenses to produce two or more vision surfaces in the lenses. Furthermore, many bifocal contact lenses cause the user to experience vision jumps as the eye changes from one corrective power to another.

Many users require several correction powers, depending on the distance to the object being viewed. However, most prior art multifocal lenses can provide only a discrete number of correction powers, usually only two or three. If what the user looks at is at a distance between that which would be in focus with one of two adjacent discrete correction powers, the object being viewed would appear blurred.

One type of soft contact lens provides variable correction powers by deforming the lens as a result of pressure between the eye and the eyelid as the eye looks down. This type of lens offers the disadvantage of requiring the user to look down at a specific angle to achieve a desired correction.

Therefore, it would be advantageous to have a lens that has a continuous range of correction powers that can be easily controlled by the user.

SUMMARY OF THE INVENTION

The disadvantages of the prior art are overcome by the present invention which is a lens having a body having a first peripheral surface, an opposite second peripheral surface and an associated focal length. The lens comprises a first material having a resilience so that as compressive force is applied to the first surface and the second surface, the focal length of the lens changes in proportion to the compressive force. The lens also includes a structure for distributing force within the lens so as to inhibit astigmatism in the lens as compressive force is applied to the first surface and the second surface.

The force-distributing structure is composed of a second material having a rigidity greater than the first material and comprises a first force-distributing member disposed in the first half of the lens in a first orientation and a second force-distributing member which is substantially equal in shape to the first force-distributing member and is disposed in the second half of the lens in a second orientation which is opposite and complementary to the first orientation. Each force-distributing member comprises a sigma-shaped frame having a central joint, the frame being disposed so that the central joint moves toward the center of the lens in a direction transverse to the direction of the compressive force when compressive force is applied to the lens. A strut extends outwardly from the central joint and away from the center of the lens, the strut moving lengthwise with the central joint. The strut is coupled to the lens so that as compressive force is applied to the first surface and the second surface of the lens in a first direction, proportionally compressive force is applied to the lens by the strut in a direction transverse to the first direction.

A structure on or in the lens engages a respective opposite eyelid or the upper and lower conjunctival sulci of a user, so that compressive force is transferred to the lens from the movement of the eyelids.

Another aspect of the invention is a method of making a variable focus contact lens. A body is formed so that the body has a first peripheral surface, an opposite second peripheral surface and an associated focal length. The lens is formed from a first material having a resilience so that as compressive force is applied to the first surface and the second surface, the focal length of the lens changes in proportion to the compressive force. A structure is disposed within the body for distributing force within the lens so as to inhibit astigmatism in the lens as compressive force is applied to the first surface and the second surface.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

DETAILED DESCRIPTION OF THE INVENTION

Figure 1:
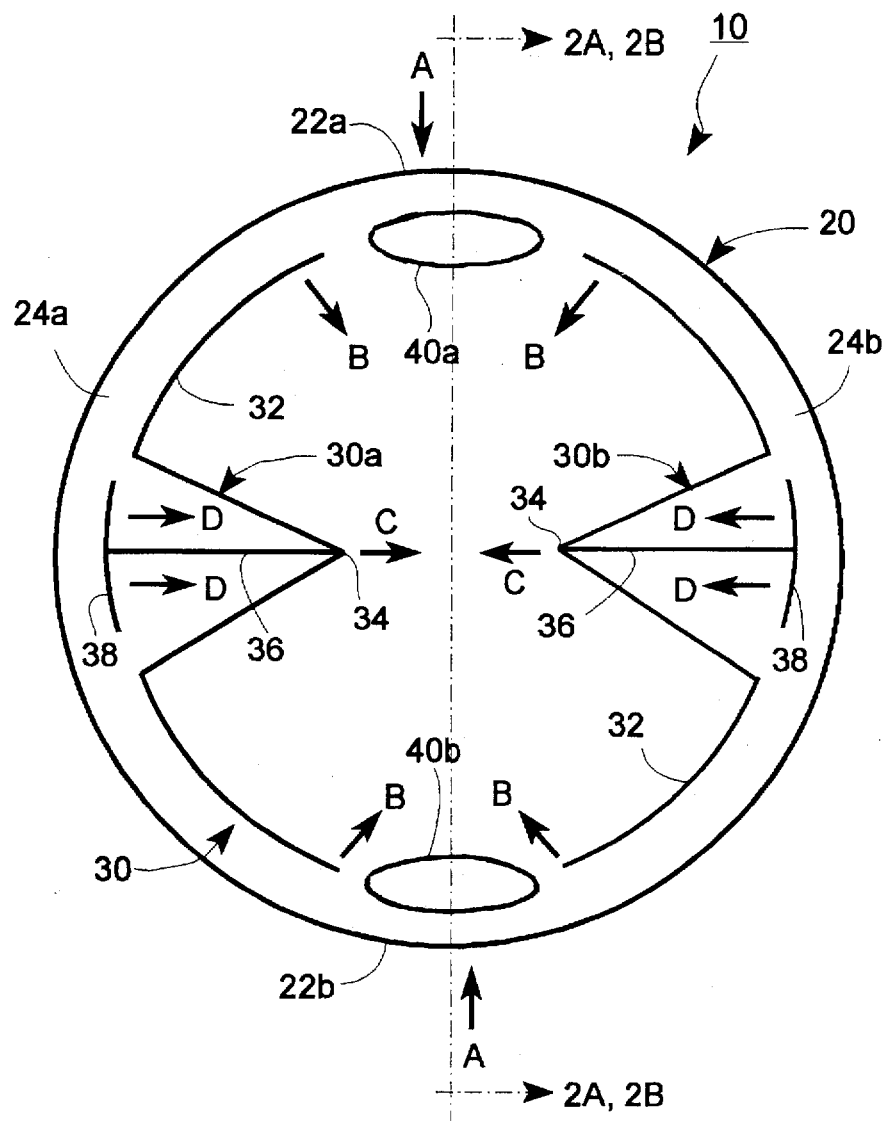
FIG. 1 is a front schematic view of a lens in accordance with the invention.

A preferred embodiment of the invention is now described in detail. Referring to the drawings, like numbers indicate like parts throughout the views. As used in the description herein and throughout the claims, the following terms take the meanings explicitly associated herein, unless the context clearly dictates otherwise: "a," "an," and "the" includes plural reference, "in" includes "in" and "on."

Figure 2A:
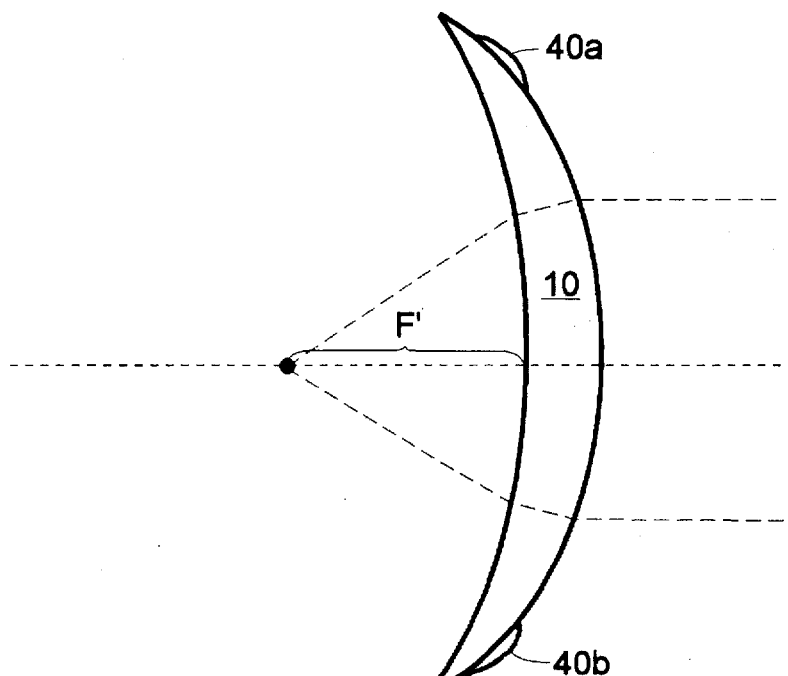
FIG. 2A is a cross-sectional view of the lens of FIG. 1 taken along line 2A,2B-2A,2B.
Figure 2B:
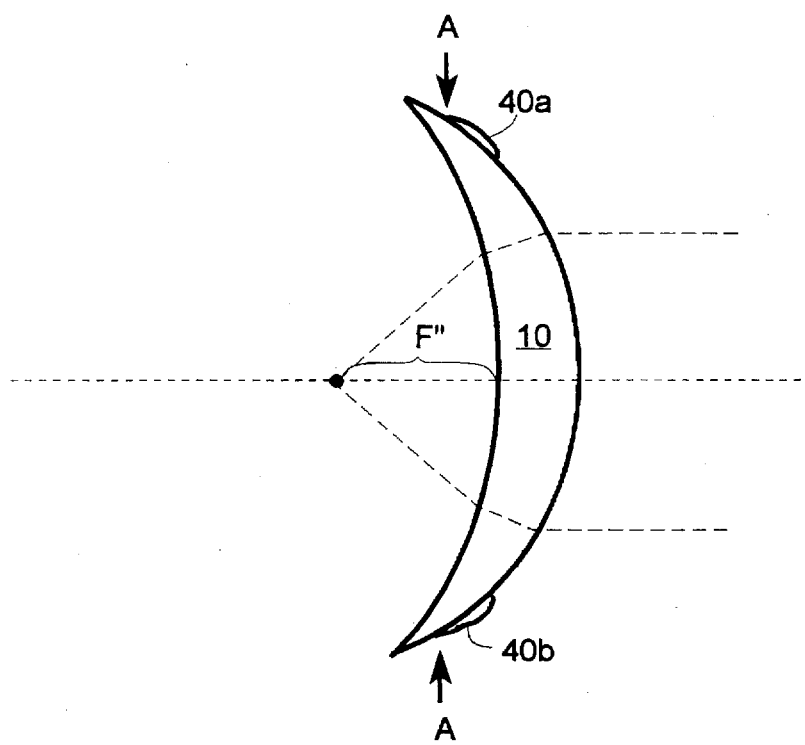
FIG. 2B is a cross-sectional view of the lens of FIG. 1 subjected to compressive force, taken along line 2A,2B-2A,2B.

As shown in FIGS. 1, 2A and 2B, one embodiment of the invention is a variable focus contact lens 10 having a body 20. The body 20 has a first half 24a and an opposite second half 24b, as taken along a vertical lines through lens 10. The lens 10 also includes an upper first peripheral surface 22a and an opposite, lower, second peripheral surface 22b as taken along a horizontal line through the lens 10. As seen in FIGS. 2A, 2B, the lens 10 further includes an associated focal length F. The lens 10 comprises a first material having a resilience so that as compressive force is simultaneously applied to the first surface and the second surface, as in direction A, the focal length F of the lens changes in proportion to the compressive force.

The first material could be any optically transparent material that is resilient when subjected to compressive forces. For some applications, one suitable material is PEGDM, a polymer of polyethylene glycol. Another suitable material is HEMA or a copolymer of PEGDM and HEMA. Other polyethylene glycol polymers may also be suitable. Other suitable materials include, but are not limited to, hydrogels and soft silicone.

A structure is 30 disposed within the lens 10 for distributing force so as to inhibit astigmatism in the lens 10 as compressive force is applied to the first surface 22a and the second surface 22b. The force-distributing structure 30 is composed of a second material having a rigidity greater than the first material. The second material could be a polymer of the same type as the first material, only cured to a higher rigidity than the first material. The second material could also comprise an extremely thin metal wire, or other materials, as would be known to one skilled in the art. The force-distributing structure 30 comprises a first force-distributing member 30a disposed in the first half 24a of the lens 10 in a first orientation. A second force-distributing member 30b, which is substantially equal, or at least complementary, in shape to the first force-distributing member 30a is disposed in the second half 24b of the lens 10b in a second orientation. The second orientation is opposite and complementary to the first orientation.

Each force-distributing member 30a and 30b comprises a sigma-shaped frame 32 having a central joint 34. The frame 32 is disposed so that the central joint 34 moves toward the center of the lens 10 in a direction C transverse to the direction of the compressive force A when compressive force is applied to the lens 10. A strut 36 extends outwardly from the central joint 34 and away from the center of the lens 10. The strut 36 moves lengthwise with the central joint 34.

A structure 38 couples the strut 36 to the lens 10 so that as compressive force is applied to the first surface 22a and the second surface 22b of the lens 10 in a first direction A, the force distributing member 30 is compressed in the direction of arrow B and proportionally compressive force (shown by arrow D) is applied to the lens 10 by the strut 36 in a direction transverse to the first direction A. The coupling structure 38 could comprise a cross piece of the second material embedded in the body 20.

A pair of eyelid engaging surfaces 40a and 40b engages the respective opposite eyelids or the upper and lower conjunctival sulci (not shown) of a user, so that compressive force is transferred to the lens from the movement of the eyelids. Thus, to change the focus F of the lens 10 the user squints, thereby putting force on the lens 10 with the eyelids. The eyelid engaging surfaces 40a and 40b could comprise a textured surface, a protruding ridge, or any other surface that could contact the eyelid of a user, as would be obvious to one skilled in the art of lens design.

The mechanism of the invention is demonstrated in FIGS. 2A and 2B. In FIG. 2A, no compressive force is applied to the lens 10 and the lens 10 has a first focal length F', which could correspond to a distance vision focus. When compressive force is applied to the lens 10, as in FIG. 2B, the lens 10 has a second focal length F", which could correspond to a near vision focus. Thus, when the user desires distance vision, he relaxes his eyelids and when the user desires near vision, he squints his eyelids, thereby compressing the lens 10.

Although a contact lens has been disclosed in this embodiment, it will be appreciated that the present invention could be embodied in a variety of lens applications. For example, it is contemplated that the present invention could be embodied in a camera lens in which the focus is changed by applying compressive force to the lens rather than physically moving the lens. The present invention could also be embodied in micro-optical applications, such as in optical fiber catheters and the like. In such applications, the invention would also comprise means for applying compressive force to the lens. Such means could comprise a mechanical device, an electro-mechanical device or a device employing an electro-chemical process, among others.

Although in a contact lens embodiment, the force distributing means would preferably be either embedded in the lens 10 or at least flush with one of the outer surfaces of the lens 10 to avoid irritation to the user's eye. In applications where the lens 10 does not come in contact with the user's eye, the force distributing means could be disposed external to the lens 10.

The above described embodiments are given as illustrative examples only. It will be readily appreciated that many deviations may be made from the specific embodiments disclosed in this specification without departing from the invention. Accordingly, the scope of the invention is to be determined by the claims below rather than being limited to the specifically described embodiments above.

What is claimed is:

1. A lens, comprising:
    a. a body having a first peripheral surface, an opposite second peripheral surface and an associated focal length, the lens comprising a first material having a resilience so that as compressive force is applied to the first surface and the second surface, the focal length of the lens changes in proportion to the compressive force; and
    b. means for distributing force within the lens so as to inhibit astigmatism in the lens as compressive force is applied to the first surface and the second surface.

2. The lens of claim 1, wherein the force distributing means comprises a second material disposed within the lens having a rigidity greater than the first material.

3. The lens of claim 2, wherein the second material has an index of refraction substantially equal to the index of refraction of the first material.

4. The lens of claim 2, wherein the lens has a first half and an opposite second half and wherein the distributing means comprises a first force-distributing member disposed in the first half of the lens in a first orientation and a second force-distributing member, which is substantially equal in shape to the first force distributing member, being disposed in the second half of the lens in a second orientation which is opposite and complementary to the first orientation.

5. The lens of claim 4, wherein each of the force-distributing members comprises:
    a. a sigma-shaped frame having a central joint, the frame being disposed so that the central joint moves toward the center of the lens in a direction transverse to the direction of the compressive force when compressive force is applied to the lens;

b. a strut extending outwardly from the central joint and away from the center of the lens, the strut moving lengthwise with the central joint; and c. means for coupling the strut to the lens so that as compressive force is applied to the first surface and the second surface of the lens in a first direction, proportionally compressive force is applied to the lens by the strut in a direction transverse to the first direction.

6. The lens of claim 1, where the first material comprises a polymer of polyethylene glycol.

7. The lens of claim 6, wherein the polymer is PEGDM.

8. The lens of claim 6, wherein the polymer is HEMA.

9. The lens of claim 6, wherein the polymer is a copolymer of HEMA and PEGDM.

10. The lens of claim 1, wherein the first peripheral surface and the second peripheral surface each comprise means for engaging a respective opposite eyelid of a user, so that compressive force is transferred to the lens from the movement of the eyelids.

11. The lens of claim 10, wherein the engaging means comprises a raised area on the first peripheral surface and the second peripheral surface.

12. The lens of claim 10, wherein the engaging means comprises a textured area on the first peripheral surface and the second peripheral surface.

13. The lens of claim 1, wherein the first peripheral surface and the second peripheral surface each comprise means for engaging a respective upper and lower conjunctival sulci of a user, so that compressive force is transferred to the lens from the movement of the eyelids.

14. A variable focus contact lens, comprising:

a. a body having a first half, an opposite second half, a first peripheral surface, an opposite second peripheral surface and an associated focal length, the lens comprising a first material having a resilience so that as compressive force is applied to the first surface and the second surface, the focal length of the lens changes in proportion to the compressive force;

b. a force-distributing structure disposed within the lens for distributing force within the lens so as to inhibit astigmatism in the lens as compressive force is applied to the first surface and the second surface, the force-distributing structure composed of a second material having a rigidity greater than the first material and comprising a first force-distributing member disposed in the first half of the lens in a first orientation and a second force-distributing member which is substantially equal in shape to the first force-distributing member and being disposed in the second half of the lens in a second orientation which is opposite and complementary to the first orientation, each force-distributing member comprising:

i. a sigma-shaped frame having a central joint, the frame being disposed so that the central joint moves toward the center of the lens in a direction transverse to the direction of the compressive force when compressive force is applied to the lens;

ii. a strut extending outwardly from the central joint and away from the center of the lens, the strut moving lengthwise with the central joint; and iii. means for coupling the strut to the lens so that as compressive force is applied to the first surface and the second surface of the lens in a first direction, proportionally compressive force is applied to the lens by the strut in a direction transverse to the first direction; and c. means for engaging a respective opposite eyelid of a user, so that compressive force is transferred to the lens from the movement of the eyelids.

15. A method of making a variable focus contact lens, comprising the steps of:

a. forming a body having a first peripheral surface, an opposite second peripheral surface and an associated focal length, the lens comprising a first material having a resilience so that as compressive force is applied to the first surface and the second surface, the focal length of the lens changes in proportion to the compressive force; and b. disposing within the body a means for distributing force within the lens so as to inhibit astigmatism in the lens as compressive force is applied to the first surface and the second surface.

16. The method of claim 15, wherein the forming step comprises the step of disposing a second material within the lens that has a rigidity greater than the first material.

17. The method of claim 15, wherein the forming step comprises:

a. disposing a first force-distributing member disposed in a first half of the lens in a first orientation; and b. disposing a second force-distributing member, which is substantially equal in shape to the first force distributing member, in a second half of the lens in a second orientation which is opposite and complementary to the first orientation.

18. The method of claim 15, further comprising forming a means for engaging a respective opposite eyelid of a user on each of the first peripheral surface and the second peripheral surface, so that compressive force is transferred to the lens from the movement of the eyelids.

19. A lens having a body comprising:

a. a first peripheral surface, an opposite second peripheral surface and an associated focal length; and b. a first material having a resilience so that as compressive force is applied to the first surface and the second surface, the focal length of the lens changes in proportion to the compressive force.

* * * * *